United States Patent [19]
Henebry et al.

[11] 4,172,305
[45] Oct. 30, 1979

[54] BACON HANGER

[76] Inventors: John P. Henebry, 110 Abingdon, Kenilworth, Ill. 61410; Wayne E. Jagusch, 1103 E. Brookwood, Arlington Heights, Ill. 60004

[21] Appl. No.: 907,716

[22] Filed: May 19, 1978

[51] Int. Cl.$^2$ ............................................. A22C 17/02
[52] U.S. Cl. ...................................... 17/44.3; 294/79; 294/85
[58] Field of Search ............... 17/44.3, 44.2; 294/120, 294/79, 85

[56] References Cited

U.S. PATENT DOCUMENTS

| | | | |
|---|---|---|---|
| 1,177,188 | 3/1916 | Keller | 17/44.3 |
| 2,412,233 | 12/1946 | Tominello | 17/44.3 |
| 3,090,990 | 5/1963 | Graper | 17/44.3 |
| 3,376,626 | 4/1968 | Anderson | 17/44.3 X |

*Primary Examiner*—Willie G. Abercrombie
*Attorney, Agent, or Firm*—Robert A. Brown; August E. Roehrig, Jr.

[57] ABSTRACT

A hanger designed for supporting pork bellies during handling and processing into slabs of bacon which is characterized by a series of spaced prongs projecting in a common plane in generally right angled relation to an elongate cross frame formed by a pair of spaced cross bar members depending from a supporting hook formation and having a grip forming member adapted to be grasped while the prongs are inserted into the pork bellie and a further grip forming member extending in the direction opposite the direction of the prongs which is adapted to be grasped in removing the prongs from the bacon slab.

6 Claims, 2 Drawing Figures

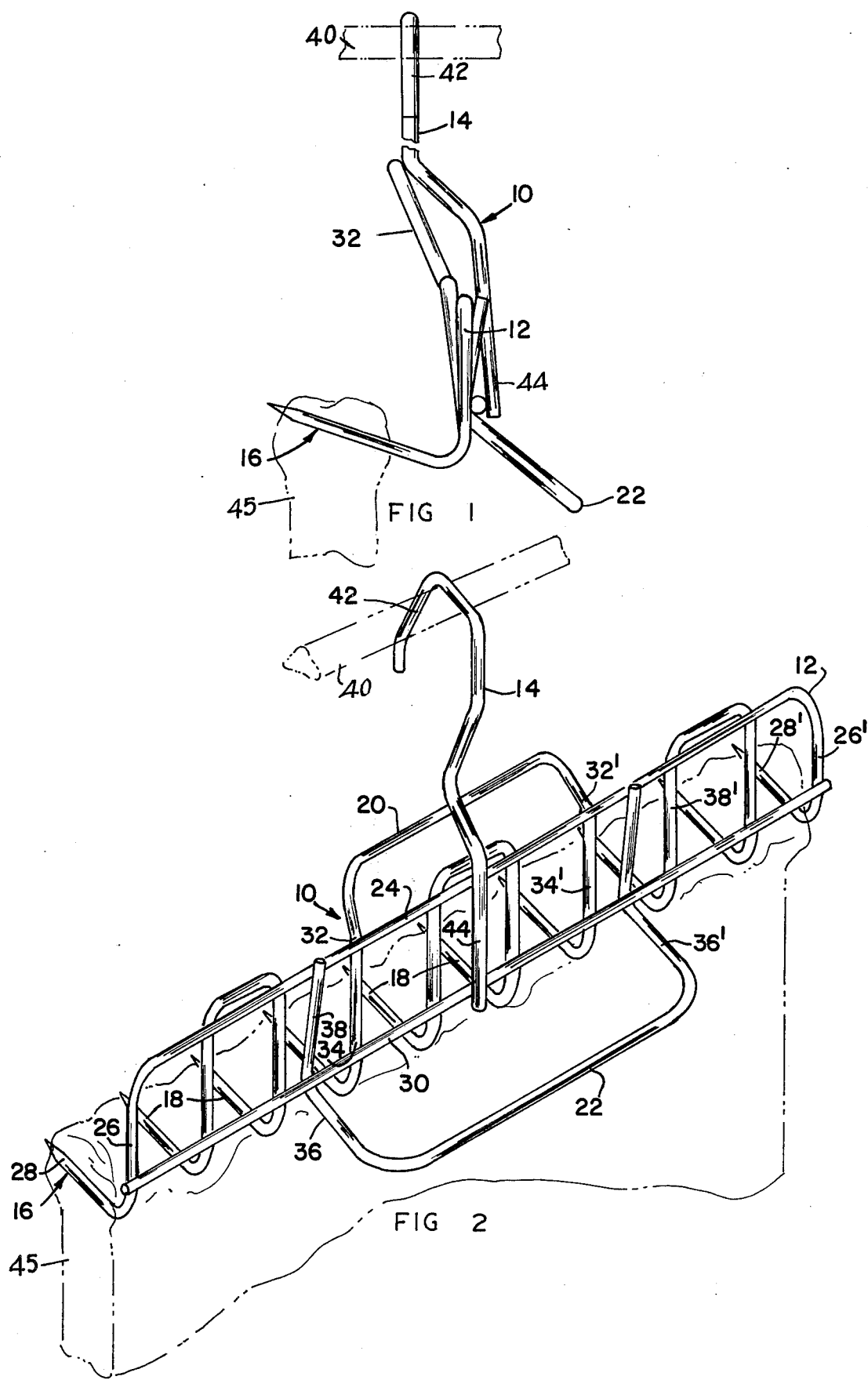

BACON HANGER

BACKGROUND OF THE INVENTION

This invention relates to equipment for supporting and handling articles, particularly meat products, in manufacturing and processing operations and is more particularly concerned with improvements in bacon hangers or combs for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional butchering and processing operation, pork bellies are transported from the butchering or cutting area to an area where they are located onto bacon hangers which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb and mounted on a frame depending from a bracket member which is shaped or otherwise formed for engaging an overhead rail, track bar, or the like. Generally, the hangers have been constructed so that the hanger teeth or prongs can be readily inserted into the relatively soft area along the narrow top ends of the bellies by holding the bellies and pressing the teeth into the same, with some portion of the frame serving as a handle for gripping it while guiding the teeth into the meat. During processing the meat loses moisture, shrinks and tends to solidify and become firm, with resulting tightening around the teeth or prongs which makes it difficult to withdraw the prongs so as to separate the processed slabs from the hangers. Generally, the hangers have been grasped at one end and pulled, while the bacon slab is held, so as to progressively work the prongs loose from the bacon with the frequent result of bending the prongs and sometimes breaking a prong loose and leaving it in the slab, thereby creating a hazard during slicing where contact with high speed knives can result in serious damage to the knives and possibly injury to personnel in the vicinity of the slicing machine. The difficulty in withdrawing the prongs results in loss of time in handling the material while the frequent breakage and resulting damage greatly increases the cost of the processing operation. Consequently, there is a well recognized need for an improved tool for this purpose which will elimiate, or at least greatly reduce, the hazard and loss encountered with the use of tools of this type heretofore available.

It is a general object of the present invention to provide an improved hanger structure for use in handling cuts of meat, particularly pork bellies, following butchering operations and during subsequent handling and processing operations.

It is a more specific object of the invention to provide a new and improved hanger structure which is especially adapted for suspending pork bellies so as to facilitate handling and processing to convert the bellies into slabs of bacon.

A further object of the invention is to provide an improved hanger structure of the type having a plurality of spaced prongs in comb-like arrangement for insertion in pork bellies or similar cuts so as to support the same during handling and/or processing wherein the hanger is provided with a grip member which is arranged relative to the prongs so as to enable the prongs to be more readily withdrawn from the meat when it is processed and the resistance to withdrawal of the prongs has greatly increased.

Another object of the invention is to provide a hanger structure of the type described for handling meat cuts which is characterized by a series of meat engaging prongs mounted on a supporting frame and constructed so as to minimize any tendency of the prongs to break loose from the supporting frame when the frame is manipulated to withdraw the prongs from engagement in the meat.

Still another object of the invention is to provide an improved bacon hanger structure having meat penetrating prongs arranged to extend in a plane at an angle to the plane of an elongate support frame, with the frame being adapted to be disposed vertically and the prongs constituting end portions of leg formations on rod members which are bent into "U" shape and which are part of the vertically disposed support frame or which are secured to the support frame by the portions of the leg formations which adjoin the bight forming portion of the "U" shape.

The invention as disclosed and claimed herein comprises an elongate support frame adapted to be disposed in a generally vertical plane and in depending relation from a support bracket, with a plurality of spaced article engaging prongs extending generally normal to the plane of the frame and a grip forming member secured to the frame intermediate its ends which extends in a plane generally normal to the plane of the frame and in the direction opposite the direction of the article engaging prongs, so as to enable the application of pulley force substantially along the axes of the prongs.

The aforesaid and other objects and advantages of the invention will become more apparent upon consideration of the preferred form of the hanger structure which is illustrated in the accompanying drawings wherein like parts are identified by the same numerals throughout the views.

BRIEF DESCRIPTION OF THE DRAWINGS

FIG. 1 is an end view of a hanger structure which is particularly adapted for use in suspending cuts of meat in a processing area with the hanger being shown in the position it will assume when mounted on an overhead support bar or track member; and FIG. 2 is a perspective view of the hanger structure of FIG. 1, with a pork bellie being shown in phantom line so as to illustrate the use of the hanger in the handling of pork bellies which are processed to form slabs of bacon.

DESCRIPTION OF THE PREFERRED EMBODIMENT OF THE INVENTION

As illustrated in the drawings the hanger 10 is designed particularly for use in suspending pork bellies for transport to an area for processing or curing, such as a smoke house. The hanger is designed so that it may be hung on a tree, in a cage, on a truck, rail or rack and moved to the processing area where it may be supported in the same manner or carried on a conveyor, or the like, during the processing and subsequent handling.

In the form illustrated the hanger comprises an elongate supporting frame 12 which is secured in vertically disposed depending relation on a hook-forming bracket 14 and which carries an assembly 16 of meat engaging prongs 18, which are arranged after the fashion of teeth in a comb, and which extend in a common plane in a generally normal direction from one side of the vertical frame 12 and along the bottom thereof. In addition to the support bracket 14 the frame structure 12 is provided with a hand-gripping member 20 extending above the top of the frame 12 and in a plane inclined from the plane of the frame 12, and slightly in the direction of the prong assembly 16. A further hand-gripping member 22 is provided on the frame 12 which extends at the bottom of the frame 12 in the direction opposite the direction of the prongs in the assembly 16.

The several elements of the hanger structure 10 in the form illustrated are fabricated from lengths of metal rod material, of suitable gauge, which are bent as shown and joined or connected by welding, or secured to each other in a similar manner. Preferably, the rod or bar material will be stainless steel so as to afford the most desirable sanitation during use.

The elongate support frame assembly 12 is formed by bending a length of rod stock into a U-shape so as to form a relatively long bight portion, which serves as the top bar 24 of the frame 12, and leg formations 25, 26' which are further bent intermediate their ends so as to provide the end prong members 28, 28' in the prong assembly 16 which members 28, 28' extend in a plane at an angle slightly less than normal to the plane of the frame assembly 12. A bottom forming bar member 30 connects the two leg formations 26, 26' and is in spaced parallel relation below the top frame member 24 so as to form the generally rectangular frame support for the meat engaging prong assembly 16. The prongs 18 intermediate the two end prongs 28, 28' are formed in pairs and attached to the frame 12. Each pair thereof is formed from a section or length of rod or bar stick by bending into U-shape so as to provide a bight portion and spaced parallel leg formations which are further bent intermediate the ends thereof to provide a pair of prongs 18 extending in a plane at an angle to the plane of the balance of the member which is secured on the frame so that portions of the legs adjoining the bight section span the area between the top bar 24 and the bottom bar 30 of the frame assembly 12. In the form shown three pairs or sets of the prongs 18 are fashioned in this manner and secured to the frame 12 with the prongs 18 constituting part of the assembly 16. A different number of prongs may be used. The grip or handle 20 is formed by bending a section or length of bar or rod material into a U-shaped configuration with spaced apart leg formations 32, 32' which are further bent to provide a pair of the prongs 18 and the assembly is mounted on the frame 12 by securing portions 34, 34' to the top and bottom frame bars or rods 24, 30. The bight portion which forms the grip or handle 20 is spaced above the top frame bar 24 a sufficient distance to accommodate the fingers in grasping the same and may be bent out of the plane of the frame 12, as shown, in the direction of the prong assembly 16 to provide a better balance in handling.

The grip member 22 is provided by bending a length or section of rod or bar stock into a U-shape configuration and further bending the spaced parallel leg formations 36, 36' intermediate their ends and out of the plane of the remainder of the member at an angle somewhat greater than normal, relative to the same, so as to permit attaching the same to the frame 12 by welding the terminal ends of the leg portions 38, 38' to the back side of the top bar member 24, that is the side opposite the prongs 18, and the opposite end portions adjoining the bends to the prong carrying side of the bottom frame bar 30, so that the pulling force on the grip member 22, in withdrawing the prongs from the meat, will not increase any tendency for separation at the welds but will have the reverse effect.

The hanger member 14 which is provided to mount the frame 12 on a rack or support bar, indicated in phantom line at 40, is formed from a length or section of bar or rod stock which is best shown to provide a downwardly opening hook formation 42 at the top and a straight terminal end section 44 for spanning the space between the top and bottom frame bars 24 and 30 with the portion intermediate the ends bent to position the top portion 42 in a vertical plane offset from the plane of the frame 12 for better balance in handling.

In the form shown, the angle of the prongs relative to the angle of the hook is so determined to have the prongs in a plane at a slight angle above horizonal. When a bellie is on the hanger this eliminates the probability of the bellie slipping off the hanger.

In using the hanger 10 one or more pork bellies, one of which is indicated in phantom line at 45, may be suspended depending upon their size relative to the size of the hanger 10. The prong assembly 16 may be conveniently engaged in the top marginal portion of the meat while the user grasps the hanger grip member 20. When the withdrawl of the prong assembly 16 is desired it is facilitated by grasping the grip member 22 and pulling in the direction away from the product 45 thereby exerting a direct withdrawal force substantially in the plane of the prong assembly 16. The connection of the grip member 22 with the frame 12 is such that substantial pulling force in the direction for withdrawal of the prongs does not apply any separating force to the joints between the grip member 22 and the frame 12, while some twisting force, which may be needed, is not likely to cause any separation of these members.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hanger structure adapted for suspending pork bellies or a similar meat product during processing, said hanger structure comprising an elongate generally rectangular base frame adapted to be positioned in a generally vertical plane, said base frame being formed by a pair of spaced, generally parallel, bar members, one of which is bent into "U" shape with end portions forming spaced leg members, the other one of said bar members having its ends connected to said leg members in spaced relation to the bight forming portion of said one bar member, a plurality of members in the form of pointed prongs adapted to be pressed into engagement with the product which prongs are spaced along the bottom edge of said base frame and are in a plane extending laterally of the one face of said base frame, a gripping member in the form of a rod bent into "U" shape with spaced leg portions secured to said frame and with the bight portion extending in a plane generally normal to the plane of said base frame and in a direction opposite that of the prongs so as to permit the user to exert a force in a direction substantially in alignment with the axes of the prongs and opposite the direction of the prongs so that it may be grasped to facilitate withdrawing the prongs from the product.

2. A hanger structure as set forth in claim 1 wherein said gripping member has end sections of said leg portions bent into the plane of said frame and each end section is welded to said pair of bar members in bridging relation so that the force exerted by said gripping member when it is grasped in withdrawing said prongs from said product will result in pressure between said end sections and said bar members in a direction which will tend to increase the binding effect of the weld connections.

3. A hanger structure as set forth in claim 1 wherein said U-shaped gripping member has terminal end sections of said leg portions secured to said bar members of said base frame with the securing points spaced along said end sections and on opposite sides of the plane of said base frame so that pull on the bight portion of said gripping member will exert pressure at the point of connection near the bottom of said frame in the direction of pull so as to avoid any tendency of said members to separate at the connecting point.

4. A hanger structure as set forth in claim 1 wherein the leg members of said U-shaped bar member on said base frame have terminal end portions shaped so as to form a pair of said pointed prongs.

5. A hanger structure as set forth in claim 1 wherein said prongs are arranged in pairs and said pairs of prongs are formed as terminals end sections of U-shaped rod members which have leg portions constituting a part of said base frame with said terminal end sections being bent at an angle to the plane of said base frame so as to extend in a common lateral plane.

6. A hanger structure adapted for suspending pork bellies during processing to form bacon slabs, said hanger structure comprising an elongate generally rectangular frame adapted to be positioned in a generally vertical plane, said frame being formed by a pair of spaced, generally parallel, bar members, one of which is bent in "U" shape with spaced leg portions bridged by the other one of said bar members, a plurality of members in the form of pointed prongs adapted to be pressed into engagement with the pork belly which prongs are spaced along the bottom edge of said frame in a plane extending laterally of the one face of the frame, a gripping member in the form of a rod bent into "U" shape with spaced leg portions secured in bridging relation to said pair of spaced bar members which form said frame and with the bight portion extending above the top bar member of said frame so as to permit the user to hold the frame in a convenient suspended position for pressing the prongs into the pork belly, and a second gripping member in the form of a rod bent into "U" shape with spaced leg portions secured in bridging relation to said pair of spaced bar members and with the bight portion extending in a plane generally normal to the plane of said frame and in a direction opposite that of the prongs.

* * * * *

UNITED STATES PATENT OFFICE
CERTIFICATE OF CORRECTION

Patent No. 4,172,305   Dated October 30, 1979

Inventor(s) John P. Henebry and Wayne E. Jagusch

It is certified that error appears in the above-identified patent and that said Letters Patent are hereby corrected as shown below:

Assignee: Beacon Metal Products, Inc.
Chicago, Illinois.

Signed and Sealed this

Eighteenth Day of March 1980

[SEAL]

Attest:

SIDNEY A. DIAMOND

Attesting Officer   Commissioner of Patents and Trademarks